United States Patent [19]
Kawakami

[11] Patent Number: 5,600,509
[45] Date of Patent: Feb. 4, 1997

[54] STORAGE APPARATUS HAVING SHIELD MEMBER FOR COVERING MAIN BODY

[75] Inventor: Yoshiyuki Kawakami, Tokyo, Japan

[73] Assignee: Kabushiki Kaisha Toshiba, Kawasaki, Japan

[21] Appl. No.: 51,783

[22] Filed: Apr. 26, 1993

[30] Foreign Application Priority Data

Apr. 27, 1992 [JP] Japan .................................. 4-27522 U

[51] Int. Cl.⁶ .................................................... G11B 33/14
[52] U.S. Cl. ........................................................ 360/97.02
[58] Field of Search ............................ 360/97.02, 97.01, 360/137, 97.03; 369/75.1, 12, 292; 361/390, 344, 399, 816, 818; 174/50.5; 181/198; 312/249.3, 223.1, 223.2

[56] References Cited

U.S. PATENT DOCUMENTS

| 4,636,781 | 1/1987 | Wills et al. | 361/390 |
|---|---|---|---|
| 4,698,707 | 10/1987 | Heys, Jr. et al. | 360/97.02 |
| 5,025,335 | 6/1991 | Stefansky | 360/97.01 |
| 5,025,336 | 6/1991 | Morehouse et al. | 360/97.02 |
| 5,164,542 | 11/1992 | Hart | 174/35 MS |
| 5,214,549 | 5/1993 | Baker et al. | 360/97.02 |
| 5,223,996 | 6/1993 | Read et al. | 360/97.02 |
| 5,276,577 | 1/1994 | Brooks et al. | 360/97.02 |
| 5,301,075 | 4/1994 | Takemoto | 360/97.02 |

FOREIGN PATENT DOCUMENTS

| 5-83166 | 1/1983 | Japan | 360/97.02 |
|---|---|---|---|
| 60-136985 | 7/1985 | Japan | 360/97.02 |
| 61-68792 | 4/1986 | Japan | 360/97.02 |
| 3-83281 | 4/1991 | Japan | 360/97.02 |

*Primary Examiner*—Stuart S. Levy
*Assistant Examiner*—Allen Cao
*Attorney, Agent, or Firm*—Finnegan, Henderson, Farabow, Garrett & Dunner, L.L.P.

[57] ABSTRACT

In a storage apparatus such as a small-sized hard disk apparatus to be built in the body of an information processing apparatus, the body of the storage apparatus comprises a metallic casing and a top cover member. The top cover member is provided with a seal member for sealing a gap between the casing 1 and the top cover member. The body of the storage apparatus is covered with a shield cover member. A metallic shield member is attached to the inside surface of the shield cover member. The shield cover member ensures electrical insulation of the body of the storage apparatus from the structural parts of the information processing apparatus excluding the storage apparatus. The metallic shield member ensures electromagnetic shield effects of, in particular, the seal member in the body of the storage apparatus.

4 Claims, 5 Drawing Sheets

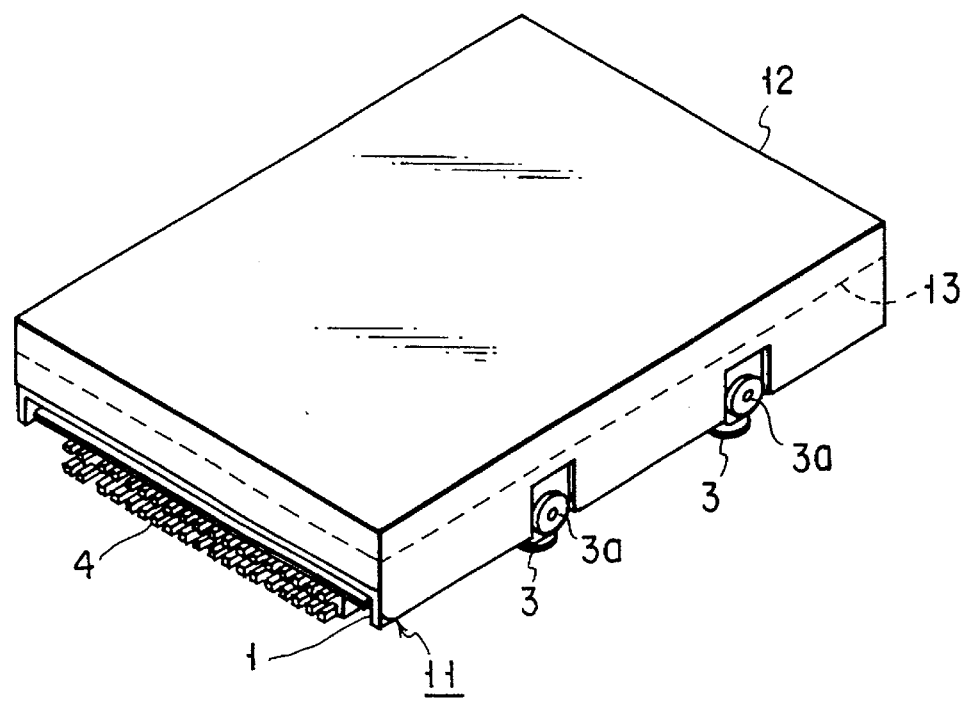
F I G. 1
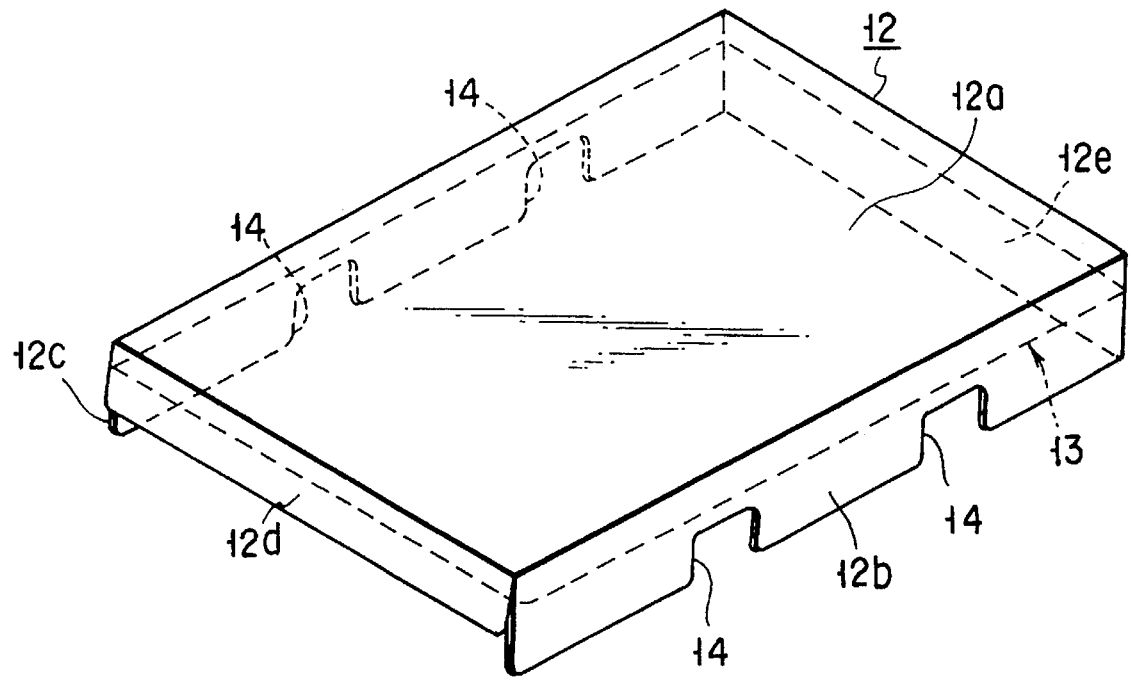
F I G. 2

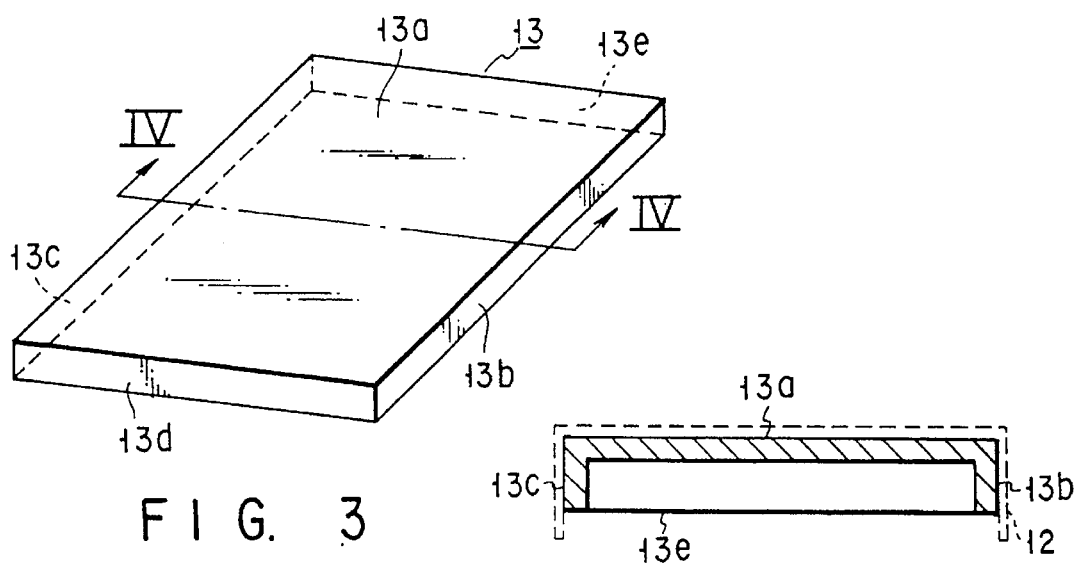
FIG. 3
FIG. 4
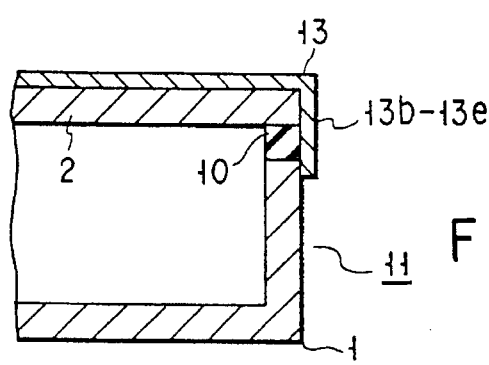
FIG. 5
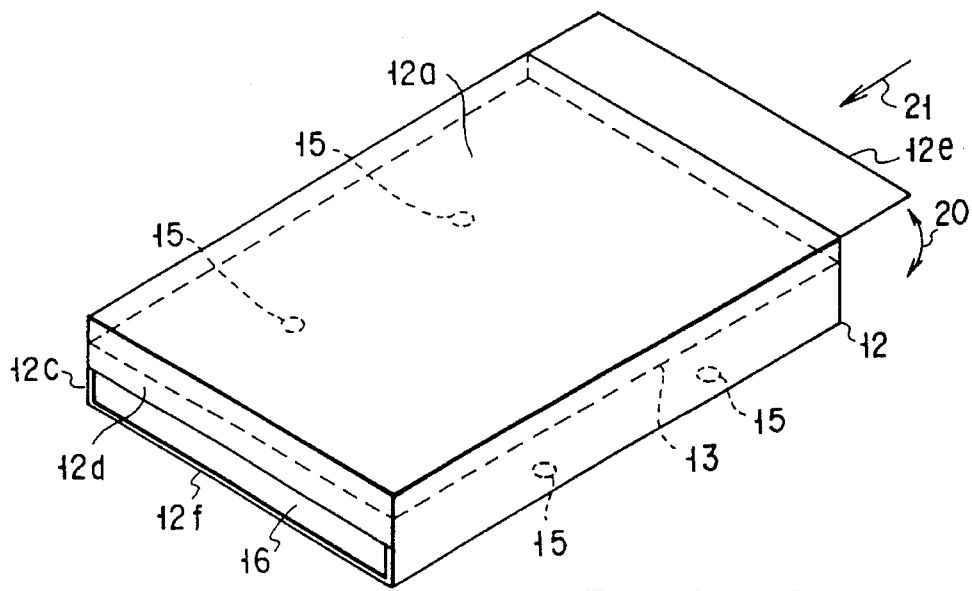
FIG. 6

STORAGE APPARATUS HAVING SHIELD MEMBER FOR COVERING MAIN BODY

BACKGROUND OF THE INVENTION

1. Field of the Invention

The present invention relates to a magnetic storage apparatus used as an external storage apparatus of an information processing apparatus such as a personal computer, and more particularly to a storage apparatus having an electromagnetic shield member for shielding against the outside.

2. Description of the Related Art

A magnetic storage apparatus such as a hard disk apparatus is used, for example, as an external memory apparatus of an information processing apparatus such as personal computer. In particular, a small-sized hard disk apparatus having a 1.8 inch disk is built in the body of the information processing apparatus.

An outer casing of an information processing apparatus such as a personal computer is normally made of an electrically insulating material such as a resin material. However, internal members of the apparatus are formed of a metallic material such as aluminum alloy in order to attain electromagnetic shield effects against the outside. A casing of a small-sized hard disk apparatus situated within the information processing apparatus is formed of a metallic material such as aluminum alloy.

As is shown in FIG. 7, the body of the small-sized hard disk apparatus comprises a box-like casing 1 and a top cover member 2. The casing 1 includes a side portion 1a and a bottom portion 1b, and, as shown in FIG. 9, a top area of the casing 1 is opened. The casing 1 accommodates a driving mechanism for driving the hard disk apparatus, as shown in FIG. 9. The driving mechanism comprises a disk 5, a rotating mechanism 8 for supporting and rotating the disk 5, a head actuator 6 for moving a head in the radial direction of the disk 5, and a voice-coil motor 7 for driving the head actuator 6.

The top cover member 2, like the casing 1, is made of a metallic material such as aluminum alloy, and the top cover member 2 is a thin plate, as shown in FIG. 10. The top cover member 2 forms a top surface of the casing 1, and it is put in contact with the side portion of the casing 1 to cover the opening of the casing 1. The top cover member 2 is fixed to the side portion 1a of the casing 1 by means of screws 9 at predetermined locations, as shown in FIG. 7, thus constituting the top surface of the casing 1. Further, as shown in FIG. 10, a rubber seal member 10 is attached to a peripheral portion of the top cover member 2, which comes in contact with the side portion 1a of the casing 1. When the top cover member 2 is fixed to the side portion 1a of the casing 1, the air-tightness of the casing 1 can be enhanced by the rubber seal member 10. Specifically, as shown in FIG. 8 (a cross-sectional view taken along line VIII—VIII in FIG. 7), the gap between the top cover member 2 and the casing 1 is filled with the seal member 10.

A small-sized hard disk apparatus is normally built in the body of an information processing apparatus such as a personal computer. In this case, as shown in FIG. 7, the bottom surface 1b of the casing 1 is provided with four fixing units 3 at predetermined locations, in order to fix the casing 1 in the body of the information processing apparatus. Each fixing unit 3 comprises a bore having a female screw structure mating with a fixing male screw. In the state in which the casing 1 is fixed in the body of the information processing apparatus by means of the fixing unit 3, the driving mechanism in the casing is electrically connected to the information processing apparatus via a connector 4 provided on the casing 1.

When the casing 1 of the hard disk apparatus is mounted within the body of the information processing apparatus, there is a case where the side portion 1a of the metallic casing 1 or top cover member 2 comes in contact with the parts mounted inside the body of the information processing apparatus. In this case, a high-frequency noise current produced, e.g. from a driving circuit for a display of the information processing apparatus may flow into the casing 1 of the hard disk apparatus. The driving mechanism housed within the casing 1 performs processing with low-intensity electric signals by means of the head supported by the head actuator 6. Thus, if the noise current flows into the casing 1, such low-intensity electric signals are influenced by noise. In the worst case, a data read/write error may occur.

In the body of the hard disk apparatus, the gap between the top cover member 2 and the casing 1 is sealed by the rubber seal member 10, as shown in FIG. 8. Since the rubber seal member 10 is electrically insulative, electromagnetic shield effects for preventing incoming of electromagnetic noise cannot be obtained. Thus, the hard disk apparatus may easily be influenced by electromagnetic noise coming from the parts built within the body of the information processing apparatus.

SUMMARY OF THE INVENTION

An object of the present invention is to provide a storage apparatus with high shield effects for preventing passing of noise current when the storage apparatus is mounted within the body of an information processing apparatus and put in contact with the parts within the information processing apparatus.

Another object of the invention is to enhance electromagnetic shield effects of a storage apparatus having, as a part of the body, a seal member formed of an electrically insulating material.

In order to achieve the above objects, there is provided a storage apparatus comprising: an apparatus body including a casing made of a metallic material for accommodating a driving mechanism for recording/reproducing data on a recording medium, the casing having a flat portion opposed to an attachment portion which is attached to an external apparatus and a shield cover member including a metallic shield member on an inner surface which faces the apparatus body, said metallic shield member being formed of an electrically insulating sheet material for covering said flat portion and side portions of the apparatus body thereby electromagnetically shielding the apparatus body.

Additional objects and advantages of the invention will be set forth in the description which follows and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings which are incorporated in an constitute a part of the specification, illustrate presently preferred embodiments of the invention, and together with the general description given above and the detailed description of the preferred embodiments given below, serve to explain the principles of the invention.

FIG. 1 is a perspective view showing an external appearance of a storage apparatus according to a first embodiment of the present invention;

FIG. 2 is a perspective view showing an external appearance of a shield cover member according to the first embodiment;

FIG. 3 is a perspective view showing an external appearance of a metallic shield member according to the first embodiment;

FIG. 4 is a cross-sectional view taken along line IV—IV in FIG. 3;

FIG. 5 is a cross-sectional view for describing the structure of the metallic shield member according to the first embodiment;

FIG. 6 is a perspective view showing an external appearance of a shield cover member according to a second embodiment of the invention;

DETAILED DESCRIPTION OF THE PREFERRED EMBODIMENTS

First and second embodiments of the present invention will now be described with reference to the accompanying drawings.

Figure 7:
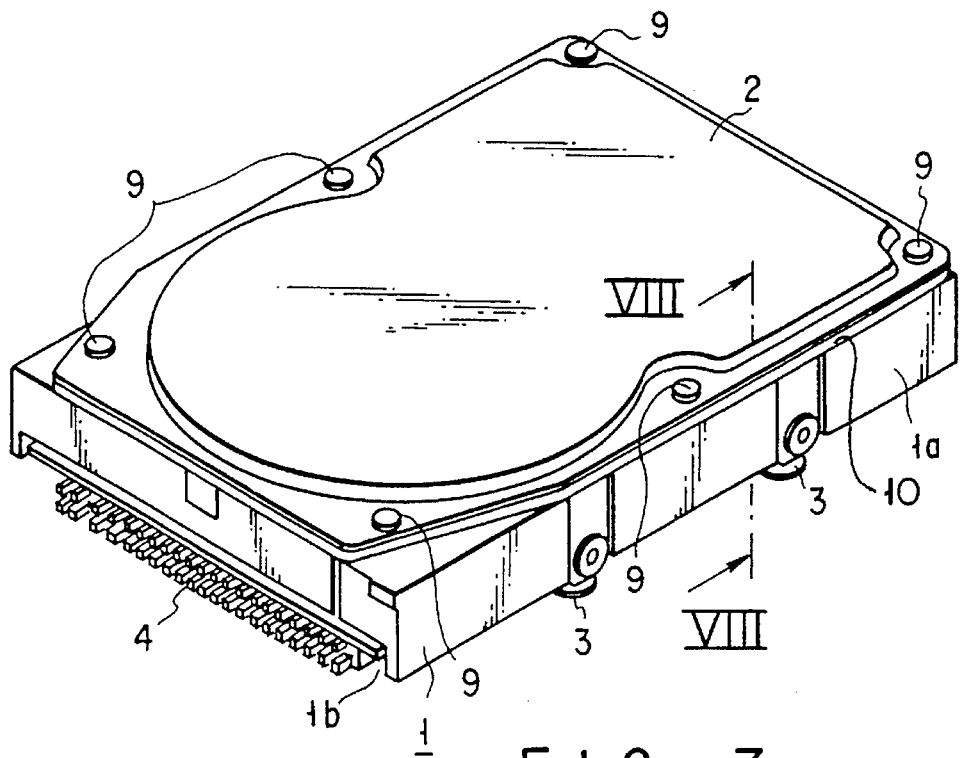
FIG. 7 is a perspective view showing an external appearance of a conventional hard disk apparatus.
Figure 8:
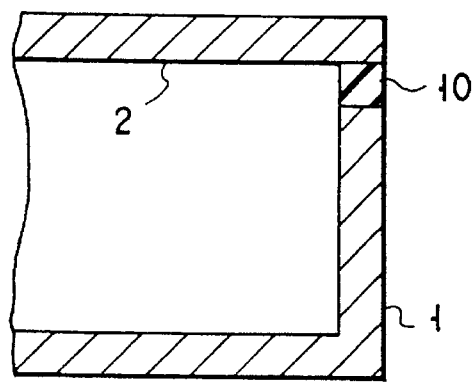
FIG. 8 is a cross-sectional view taken along line VIII—VIII in FIG. 7.
Figure 9:
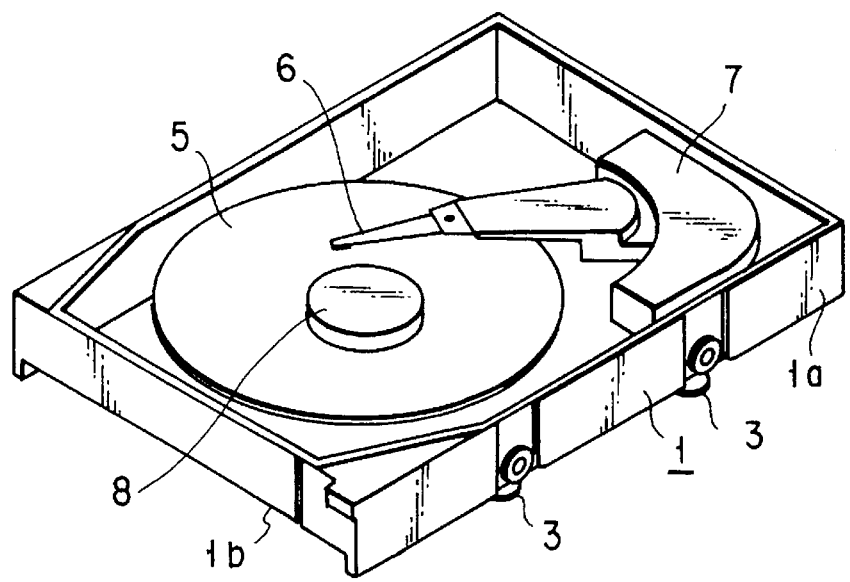
FIG. 9 is a perspective view showing an external appearance of a driving mechanism of the conventional hard disk apparatus.
Figure 10:
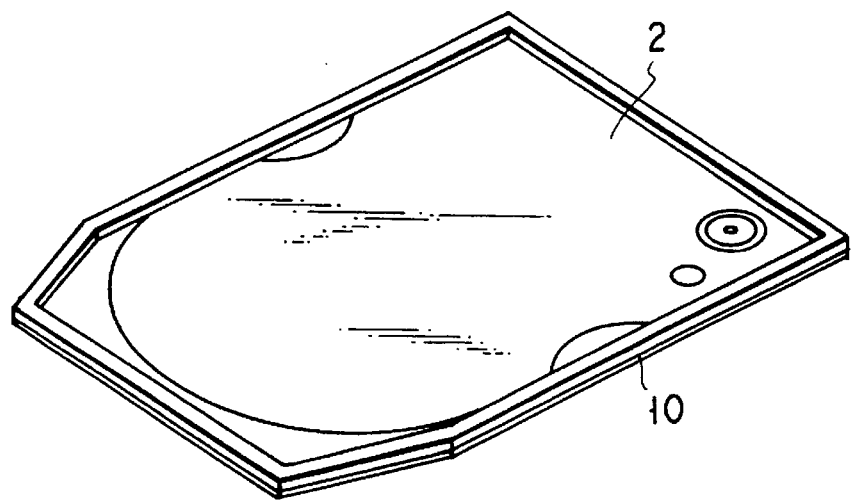
FIG. 10 is a perspective view showing an external appearance of a top cover member of the conventional hard disk apparatus.

According to the first embodiment, the storage apparatus comprises an apparatus body 11 and a shield cover member 12, as shown in FIG. 1. The apparatus body 11 is, e.g. a small-sized hard disk apparatus, as shown in FIGS. 7, 9 and 10, and it comprises a casing 1 made of a metallic material such as aluminum alloy and a top cover member 2 made similarly of a metallic material such as aluminum alloy. The casing 1 accommodates a driving mechanism for driving the hard disk apparatus, as shown in FIG. 9.

The shield cover member 12 is a structural element in which the subject matter of the invention resides. The shield cover member 12 is an electrically insulative resin-made sheet member. The material of the shield cover member 12 is, e.g. polyester resin which is commercially available as Du Pont mylar (trademark).

The shield cover member 12 covers the top portion (top cover member 2) of the apparatus body 11 and the side portion (casing 1), thereby maintaining electrical insulation of the apparatus body 11 from various external parts. The external parts are the structural elements, other than the parts of the hard disk apparatus, which are accommodated within the information processing apparatus such as personal computer, when the apparatus body 11 is mounted within the information processing apparatus.

As is shown in FIG. 2, the shield cover member 12 comprises a top sheet portion 12a corresponding to the top portion of the apparatus body 11, and four side sheet portions 12b–12e corresponding to the side portions of the apparatus body 11. Accordingly, the shield cover member 12 has a shape of a cover of a box. The top sheet portion 12a has such a size to cover the entire surface of the top cover member 2 of the apparatus body 11. Each of the side sheet portions 12b to 12e has such a size to cover the corresponding one of the four side portions of the casing 1, but the side sheet portions 12b to 12e are formed so as not to cover the connector 4 and fixing units 3a on the side portions of the apparatus body 11. Specifically, as shown in FIG. 2, the length of the side sheet portion 12d is less than that of the opposed side sheet portion 12e by a degree corresponding to the size of the connector 4. The side sheet portions 12b and 12c are provided with notches 14 at locations corresponding to the fixing units 3a. Each fixing unit 3a is the same as the fixing unit 3 provided on the bottom of the casing 1. Each fixing unit 3a comprises a bore having a female screw structure mating with a fixing male screw. By virtue of the fixing units 3a, the side portions of the apparatus body 11 can be fixed in the information processing apparatus.

The shield cover member 12 has a metallic shield member 13 on its inner surface, which is opposed to the apparatus body 11 when the apparatus body 11 is covered with the shield cover member 12. The metallic shield member 13 is manufactured such that the surface of a thin iron plate base having a thickness of about 30 to 50 μm is plated with zinc. The metallic shield member 13, along with the shield cover member 12, covers the apparatus body 11, thereby to attain electromagnetic shield effects for preventing incoming of electromagnetic noise.

The metallic shield member 13, as shown in FIG. 3, has a shape of a cover of a box, which matches with the shape of the shield cover member 12. Specifically, the metallic shield member 13 comprises a top portion 13a corresponding to the top sheet portion 12a and side portions 13b to 13e corresponding to the side sheet portions 12b to 12e.

Like the shield cover member 12, the metallic shield member 13 does not have a bottom portion corresponding to the bottom of the casing 1, as shown in FIG. 4 (a cross-sectional view taken along line A—A in FIG. 3). The size of the top portion 13a of the metallic shield member 13 is substantially the same as the size of the top sheet portion 12a of the shield cover member 12. By contrast, the height of each of the side portions 13b to 13e is less than the height of each of the side sheet portions 12b to 12e of the shield cover member 12. Specifically, as shown in FIG. 5, in the apparatus body 11 of the hard disk apparatus, the gap between the top cover member 2 and the casing 1 is filled with the seal member 10. In other words, the side portions of the apparatus body 11 includes the seal member 10 attached to the top cover member 2. There is no problem if each of the side portions 13b to 13e of the metallic shield member 13 has such a height as to cover the seal member 10. On the other hand, each of the side sheet portions 12b to 12e of the shield cover member 12 must have such a height as to cover the entire side portions of the apparatus body 11.

The metallic shield member 13 is attached to the inner surface of the shield cover member 12, for example, by means of an adhesive.

The technical advantages of the present invention will now be described.

In the case where the apparatus body 11 of the hard disk apparatus is mounted as an external storage apparatus within the information processing apparatus such as a personal computer, the top portion (top cover member 2) and side portions (casing 1) of the apparatus body 11 are covered with the shield cover member 12 having the metallic shield member 13, as shown in FIG. 1. In the state in which the top and side portions of the apparatus body 11 are covered with the shield cover member 12, the apparatus body 11 is fixed within the information processing apparatus by making use of the fixing units 3 on the bottom of the apparatus body 11 and/or the fixing 10 units 3a on the side portions thereof. The driving mechanism stored in the casing 1 is electrically connected to the information processing apparatus via the connector 4 provided on the casing 1.

When the apparatus body 11 is mounted within the information processing apparatus, it is possible that the apparatus body 11 comes in contact with the parts provided within the information processing apparatus. In the present invention, since the apparatus body 11 is covered with the shield cover member 12, electrical insulation from the contacting parts can be maintained. Thus, even if a high-frequency noise current flows, e.g. from a driving circuit for a display device, the noise current is shielded by the shield cover member 12, and the noise current is prevented from flowing into the apparatus body 11. Thereby, unlike the prior art, noise current is prevented from adversely affecting low-intensity electric signals processed in the driving mechanism of the apparatus body 11, and a data write/read error can be prevented.

In addition, since the shield cover member 12 is provided with the metallic shield member 13, electromagnetic shield effects for preventing electromagnetic noise from passing through the seal member 10 can be obtained (see FIG. 5). Since the seal member 10 is made of an electrical insulator such as rubber, it does not have electromagnetic shield effects for preventing passing of electromagnetic noise. Thus, in the prior art, the hard disk apparatus can easily be influenced by electromagnetic noise from the parts built within the information processing apparatus. However, according to the present invention, such a drawback can be overcome.

FIG. 6 is a perspective view showing a second embodiment of the present invention. In the second embodiment, the shield cover member 12 has a bottom sheet portion 12f corresponding to the bottom portion of the apparatus body 11 (i.e. the bottom portion 1b of the casing 1 shown in FIG. 9), so that the shield cover member 12 can cover substantially the entire surfaces of the apparatus body 11. The metallic shield member 13 in the second embodiment has the same shape as the metallic shield member in the first embodiment (see FIG. 3).

The side sheet portion 12d of shield cover member 12 according to the second embodiment is provided with an opening 16 corresponding to the size of the connector 4. In addition, the bottom sheet portion 12f has holes 15 at locations corresponding to the fixing units 3. The apparatus body 11 is fixed within the body of the information processing apparatus by means of the fixing units 3 with screws passed through the holes 15.

The side sheet portion 12e is openable (in the direction of arrow 20). The side sheet portion 12e is opened when the apparatus body 11 is inserted into the shield cover member 12 in the direction of arrow 21. When the insertion of the body 11 is completed, the side sheet portion 12e is closed so as to form a part of the side portions of the shield cover member 12.

By using the shield cover member 12 having the above structure, the electrical insulation of the entire surfaces of the apparatus body 11 including the bottom portion can be ensured when the body 11 is mounted in the information processing apparatus. Thus, noise current shield effects for preventing noise current from flowing into the apparatus body 11 can be prevented. Since the shield cover 12 of the second embodiment, too, is provided with the metallic shield member 13, electromagnetic shield effects for preventing electromagnetic noise from passing through the seal member 10 can be obtained.

A process of manufacturing the shield cover member 12 having the metallic shield member 13 will now be described with reference to FIGS. 11A to 11D.

Figure 11A:
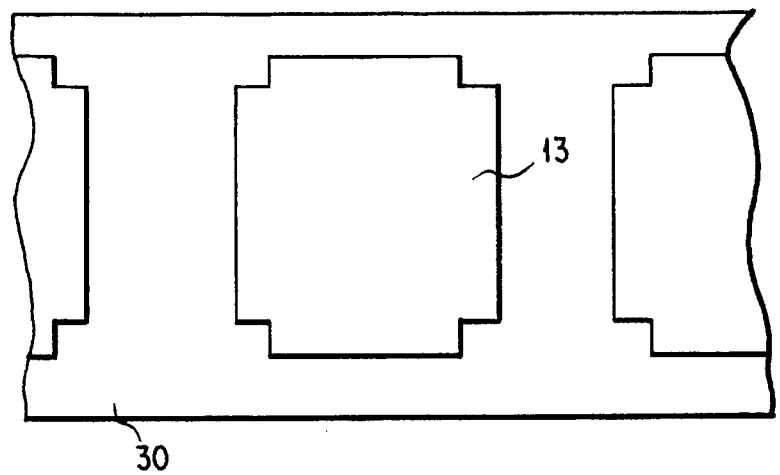
FIGS. 11A to 11d are views for illustrating a process of manufacturing the shield cover member of the present invention.
Figure 11B:
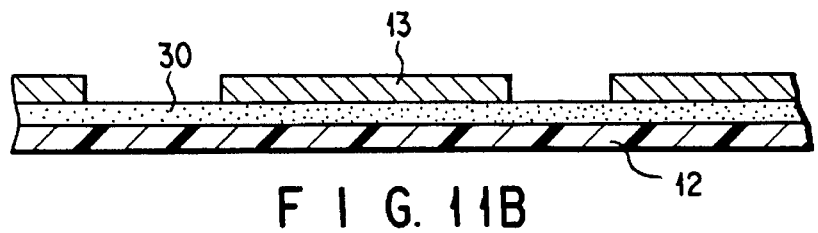
Figure 11C:
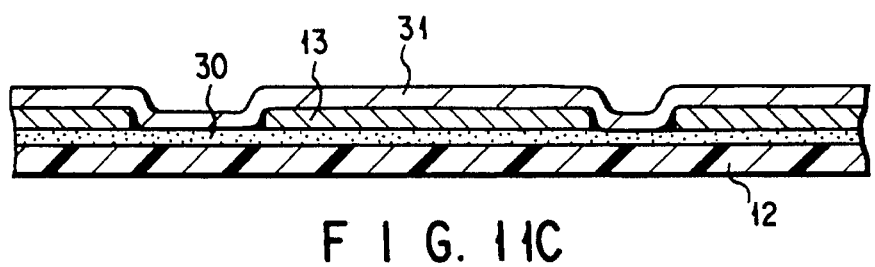
Figure 11D:
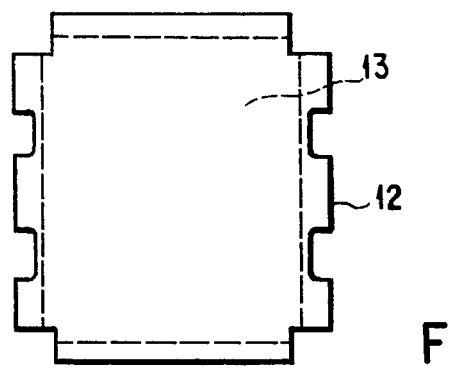

AS iS shown in FIG. 11A, a resin sheet material coated with an adhesive, from which the shield cover member 12 will be formed, is prepared. The metallic shield member 13 is adhered by an adhesive to the surface of the resin sheet material. As shown in FIG. 11B (cross-sectional view), a resin sheet material (12) on which the metallic shield member 13 is adhered is formed. A paper sheet 31 is attached to the surface of the resin sheet member (12), as shown in FIG. 11C. The paper sheet 31 has a shape corresponding to the shield cover member 12, as shown in FIG. 11D.

Subsequently, the resin sheet member (12) is cut out in accordance with the shape of the paper sheet 31. The paper sheet 31 is peeled off, and the resin sheet member (12) to which the metallic shield member 13 is attached is formed, as shown in FIG. 11D. The four sides of the resin sheet member (12) are bent. Thus, as shown in FIG. 2, the box-shaped shield cover member 12 is obtained.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A disk drive comprising:

a casing having a bottom portion and four side portions made of a metallic material, the side portions extending upward to top surfaces from a top surface of the bottom portion;

a seal member on the top surfaces of the four side portions;

a top cover having top and bottom surfaces on the seal member at a perimeter of the top cover; the top cover, the casing, and the seal member forming a chamber for accommodating a driving mechanism for recording/reproducing data on a recording medium;

a metallic shield member of an electromagnetically shielding material for electromagnetically shielding part of the side portions of the casing including the seal member, the metallic shield member including a base portion for covering the top surface of the top cover, and the four side portions extending downward from the base portion of the metallic shield member for covering the seal member, side surfaces of the top cover member, and part of the side portions of the casing; and a shield cover member of an electrically insulating sheet material attached to the metallic shield member, the shield cover member having a base portion for covering the entire base portion of the metallic shield cover, and the four side portions extending downward from the base portion of the shield cover member for covering the corresponding side portions of the metallic shield member.

2. A disk drive according to claim 1, wherein said shield cover member is made of an electrically insulating resin sheet material.

3. A disk drive according to claim 1, wherein said metallic shield member is attached by means of an adhesive to an inner surface of the shield cover member which faces the top cover member and the casing.

4. A disk drive according to claim 1, wherein one of the side portions of the shield cover member is designed to be openable for mounting/demounting the driving mechanism in the chamber.

* * * * *